US00RE37801E

(19) United States
(12) Reissued Patent
Shimada et al.

(10) Patent Number: US RE37,801 E
(45) Date of Reissued Patent: Jul. 23, 2002

(54) OPTICAL RECORDING DISK CAPABLE OF RESYNCHRONIZATION IN DIGITAL ENCODING AND DECODING

(75) Inventors: Toshiyuki Shimada, Kadoma; Takeshi Nakajima, Osaka, both of (JP)

(73) Assignee: Matsushita Electric Industrial Co., Ltd., Osaka (JP)

(21) Appl. No.: 09/295,376

(22) Filed: Apr. 21, 1999

Related U.S. Patent Documents

Reissue of:
(64) Patent No.: 5,623,477
Issued: Apr. 22, 1997
Appl. No.: 08/592,486
Filed: Jan. 26, 1996

U.S. Applications:

(62) Division of application No. 08/212,724, filed on Mar. 14, 1994, now Pat. No. 5,546,427.

(30) Foreign Application Priority Data

Mar. 15, 1993 (JP) ..... 5-054186

(51) Int. Cl.[7] ..... G11B 7/24
(52) U.S. Cl. ..... 369/275.3; 369/59.25; 341/59; 341/94; 375/293
(58) Field of Search ..... 369/275.3, 59.23, 369/59.1; 341/59, 94, 58; 375/293, 364; 300/40, 41, 48

(56) References Cited

U.S. PATENT DOCUMENTS 4,484,176 A 11/1984 Fitzpatrick
4,774,701 A 9/1988 Ozaki et al.
4,862,443 A 8/1989 Tsuji et al.
5,229,986 A 7/1993 Mizokami et al.
5,333,126 A 7/1994 Fukuda et al.
5,383,171 A 1/1995 Mizokami et al.
5,416,760 A * 5/1995 Masood et al. ..... 369/46
5,451,943 A 9/1995 Satomura
5,541,960 A * 7/1996 Satomura et al. ..... 375/368
5,557,594 A * 9/1996 Chiba et al. ..... 369/59
5,982,718 A * 11/1999 Takiguchi ..... 369/32

FOREIGN PATENT DOCUMENTS

JP 56-101615 8/1981
JP 8-279251 * 10/1996
JP 54-46952 6/1998

* cited by examiner

*Primary Examiner*—Tan Dinh
(74) *Attorney, Agent, or Firm*—Smith, Gambrell & Russell, LLP

(57) ABSTRACT

In carrying out PWM-recording on optical disks, RESYNC BYTES including a bit compensation part, RESYNC detection part, and bit synchronization part are periodically inserted in the recorded data code stream. After encoding and at the time of decoding, RESYNC BYTES are detected by detection of the RESYNC detection part. The decoder is initialized by detecting the position of the bit synchronization part and decoding is performed satisfactorily free from error. With this configuration, even for synchronization bytes having a comparatively long portion of consecutive code values, bit resynchronization is enabled free from mis-detection caused by peak shift. Even with the recording and reproducing characteristics with an un-symmetrical unerased area of the mark and space parts, the RESYNC detection part is fixed to either mark or space and RESYNC BYTES with little influence on an unerased area can be realized.

6 Claims, 7 Drawing Sheets

Fig. 3(a) ORIGINAL DATA

Fig. 3(b) (1, 7)ENCODED DATA

Fig. 3(c) RESYNC POSITIONING PULSE

Fig. 3(d) NRZI ENCODED DATA

Fig. 3(e) WRITE DATA

Fig. 3(f) RECORDED MARK

Fig. 5(a) WRITE DATA
Fig. 5(b) RECORDED MARK
Fig. 5(c) REPRODUCED SIGNAL
Fig. 5(d) DETECTED DATA
Fig. 5(e) REPRODUCED CLOCK
Fig. 5(f) DETECTED DATA
Fig. 5(g) 11T DETECTED
Fig. 5(h) RESYNC GATE
Fig. 5(i) 3T DETECTED
Fig. 5(j) RESYNC DETECTED
Fig. 5(k) NRZI DECODED DATA
Fig. 5(l) (1,7) DECODED DATA
RESYNC
SLICE LEVEL
DECODE ERROR
TIME

Fig. 6(a) RECORDED MARK

Fig. 6(b) REPRODUCED SIGNAL

Fig. 6(c) DETECTED DATA

Fig. 6(d) RECORDED MARK

Fig. 6(e) REPRODUCED SIGNAL

Fig. 6(f) DETECTED DATA

OPTICAL RECORDING DISK CAPABLE OF RESYNCHRONIZATION IN DIGITAL ENCODING AND DECODING

Matter enclosed in heavy brackets [ ] appears in the original patent but forms no part of this reissue specification; matter printed in italics indicates the additions made by reissue.

This is a divisional of U.S. application Ser. No. 08/212,724, filed on Mar. 14, 1994, and now is U.S. Pat. No. 5,546,427.

BACKGROUND OF THE INVENTION

1. Field of the Invention

This invention relates to a recording/reproducing apparatus which records and reproduces digital signals, and more particularly to the digital data encoding/decoding apparatus for optical disk apparatus which carries out mark edge recording by pit width modulation.

2. Related Art of the Invention

In recent years, the optical disk apparatus has attracted keen public attention as a digital information recording/reproducing apparatus with a large storage capacity and the ability to interchange media. In the optical disk apparatus, the digital data is encoded for recording in such a manner that it fits in the recording/reproducing channel characteristics determined by the optical head and optical recording media, and reproduced signals are data/detected to make binary-coded signals, from which decoding is carried out to obtain original digital data. Based on this, encoding and decoding techniques to enable efficient digital recording and reproducing have been put into practical use as various digital data encoding/decoding apparatus.

In the general procedure to record and reproduce digital data, first of all, the code stream obtained by encoding the data with modulation having a proper rule is recorded. When reproducing, the clock signals which are clock components of the code stream are retrieved from the reproduced signals by utilizing the properties of the code stream imparted by the above-mentioned modulation. Based on the retrieved clock signals obtained, the recorded code stream is separated and the original digital data is obtained by decoding, which is the operation reverse to encoding. As one example, in the standard format of a 130-mm diameter magneto-optic disk data file apparatus, a (2, 7) code is used as the encoding system as found in the International Standard (ISO/IEC DIS 10089). Table 1 shows the conversion rule of the (2, 7) code.

The (2, 7) code is an encoding system which converts 1-bit digital data to 2-bit codes, and is so called because of its characteristic that a "1" is separated by a minimum of two "0's" and a maximum of seven "0's" in the code stream after encoding an original digital data stream. This encoding rule is called (d, k) conversion rule because a "1" is separated by a minimum of d "0's" and a maximum of k "0's" in the code stream after encoding. Consequently, in the case of the (2, 7) code, a "1" exists intermittently at the clock frequency from 3 to 8 in the code stream at encoding, and with this point as a premise, the code frequency which is a clock component is obtained to make a reproduced clock signal rendering itself capable for detecting the above-mentioned data.

In general, in this type of encoding/decoding, decoding timing to the bits of the code stream and the data stream is to be properly provided when the original data stream is decoded from the reproduced code stream. Otherwise, such decoding timing failure does not keep the rule of the encoding system and will result in errors. In the case of Table 1, the 1-bit data must be made to correctly correspond with the 2-bit code. For this purpose, a specific code pattern called SYNC or RESYNC BYTE is inserted in the code stream after encoding to achieve bit synchronization at the time of decoding. In the above-mentioned international standard, for the RESYNC BYTE,

{0 0 1 0 0 0 0 0 0 0 1 0 0 1 0 0} is periodically inserted, and in the event of decoding operation, first, this RESYNC BYTE is detected; then, based on this, the above-mentioned bit synchronization is achieved for decoding. This RESYNC BYTE is a pattern which cannot exist in any code stream after encoding for any data stream in the rule specified in Table 1, and a RESYNC BYTE will never be detected by mistake with other code data.

This kind of method enables this bit synchronization by periodically arranging bit patterns, which can easily be identified, as a RESYNC BYTE to achieve bit synchronization in the encoded code streams as described in, for example, OPTICAL DATA FORMAT EMPLOYING RESYNCHRONIZABLE DATA SECTORS, U.S. Pat No. 4,791,622 by D. W. Clay et al. and SYNC ENCODING SYSTEM FOR DATA SECTORS WRITTEN ON A STORAGE AGE MEDIUM, U.S. Pat. No. 4,797,167 by M. J. O'Keeffe et al. This bit synchronization pattern is called a SYNC BYTE when it is used at the data head, and a RESYNC BYTE when used at the intermediate position. The SYNC BYTE decides the bit synchronization at the start of decoding, while the RESYNC BYTE periodically corrects deviation of a decoding bit to prevent propagation of decoding error after any defect occurs when clock reproduction failure occurs in the middle of data reproduction, and both frequently have the same patterns.

In the meantime, in the present optical disks, a large number of developments have been undertaken to increase the capacity to store more and more information, and in order to avoid complication of data controls associated with the increased storage capacity, the unit of the recording data amount must also be increased. When the recording data unit is increased, there will be more possibility to cause failure to reproduce clocks during data reproduction due to the drop-out of reproduced signals arising from a defect of the media, and the system reliability will be lowered. The importance of the RESYNC BYTE has been further increased to suppress continuous occurrence of decoding errors in order to prevent disability in decoding all of the data after the clock reproduction failure occurs.

In the conventional optical disk apparatus, as a method to record and reproduce data, mark position recording (MPR) in which the recording mark position is used for information recording is carried out; this is called pit position modulation (PPM) because of the recording pit another name of the recording mark, and has characteristics to correctly record and reproduce the data even when there is a variation in pit size. However, in order to further increase the recording density, the pit width modulation (PWM) which carries out mark edge recording (MER), in which the position and length of the recording mark are used for recording of information, has begun to be put into practical use.

For the encoding rule in the PPM recording system, the (2, 7) code has the superior capabilities, and the PPM recording system using this (2, 7) code has been adopted in the above-mentioned international standard, but as part of further improving the recording density, in the PWM recording, investigation has been made on systems such as a (1, 7) code. In this mark edge recording, NRZI code is performed after a (2, 7) or (1, 7) code. The positional relationship between the mark formed in correspondence with the part in which "1" of the code stream obtained as above continues and the space other than this formed by "0" is used for recording information.

The mark is formed by applying the comparatively high optical output to the medium and locally raising medium temperature, and has a problem that the positional relationship of mark edge deviates when the optical output deviates from the optimum value. That is, when the optical output is greater than the optimum value, the recorded mark generally becomes larger, and, on the contrary, when it is smaller, it becomes smaller, causing the power margin, the set margin for optical output in recording, to become smaller. In this way, the positional relationship between the mark initiation end and the finish end deviates from the optimum bit intervals of code data, resulting in higher possibility to cause decoding errors in achieving synchronization of data from reproduced signals for decoding.

When the (2, 7) code is used as a technique to solve this kind of problem, for example, as is found in DATA RECORDING/REPRODUCING DEVICE, U.S. Pat. No. 5,229,986 by Mizokami et. al., specially designing the data detection method during reproduction has enabled the development of a technique to improve the detection allowance for mark formation. In this method, synthesis of both takes place after the mark initiation end and the finish end are independently binary-coded and clock-reproduced, and both are designed to achieve bit-synchroniztion independently. Consequently, the data detection method is limited and it is not generally applicable.

SUMMARY OF THE INVENTION

It is an object of the present invention to provide a highly reliable apparatus with improved recording/reproducing power margin, etc. by realizing highly reliable RESYNC BYTES in optical disks using mark edge recording.

It is another object of the present invention to provide an apparatus which can detect RESYNC BYTES satisfactorily in an optical disk of the CLV (constant linear velocity) system.

Furthermore, it is another object of the present invention to detect good RESYNC BYTES even in an optical disk with different erase characteristics for the mark and space by limiting the RESYNC detection part of RESYNC BYTES to the mark or space.

Preferably, a specific pattern is given to the invalid data of the portion corresponding to RESYNC BYTES to operate an encoder, and in inserting RESYNC BYTES in the corresponding portion of the code stream after encoding, the present invention enables smooth connection in terms of code regularity.

The above and other objects of the present invention are realized in the digital data encoding apparatus of the present invention that periodically inserts RESYNC BYTES comprising a bit compensation part, RESYNC detection part, and bit synchronization part into the code stream of the digital data encoded in accordance with the (d, k) conversion rule.

In addition, the digital data encoding method and apparatus of the present invention has an encoding means to encode data input in accordance with the (d, k) conversion rule and RESYNC BYTES adding means which periodically generates RESYNC BYTES comprising a bit compensation part, RESYNC detection parts and a synchronization part. Furthermore, it is provided with an encoding means to perform NRZI encoding on the (d, k) encoded code and RESYNC BYTES.

The digital data decoding apparatus of the present invention comprises a means to detect RESYNC BYTES, a means to detect bit synchronization, and a decoding means to be initialized by the means to detect bit synchronization.

In addition, by making the RESYNC detection part longer than k, the correlationship between RESYNC BYTES and code data of other parts is made extremely small.

Furthermore, by making the size of RESYNC detection part sufficiently larger than k, exclusive detection of RESYNC BYTES is made easy even in the CLV system.

The present invention will achieve highly reliable decoding operation by realizing RESYNC BYTE comprising a bit compensation part, RESYNC detection part, and bit synchronization part and initializing the decoder by detecting the bit synchronization part after detecting the existence of the RESYNC detection part based on the above-mentioned configuration.

Figure 1:
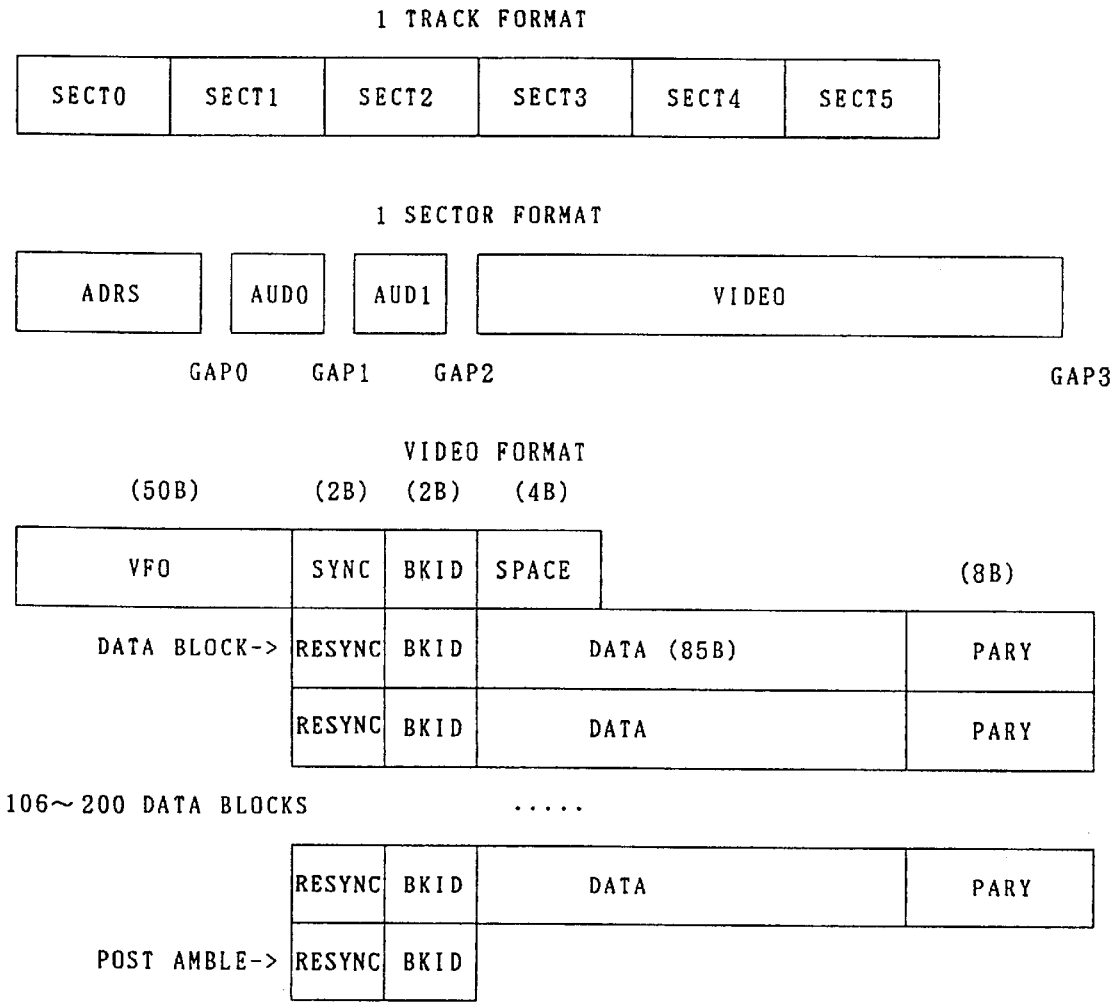
FIG. 1 is a diagram of the recording format.

TABLE 1 is a conversion table of (2, 7) code;

TABLE 2 is a conversion table of (1, 7) code;

TABLE 3 is No. 1 table of RESYNC BYTES;

TABLE 4 is No. 2 table of RESYNC BYTES.

DESCRIPTION OF THE PREFERRED EMBODIMENT

Referring now to the drawings, a digital data encoding method and apparatus of one embodiment according to the present invention is described with the case taken as an example, in which audio signal 2 channels and video signals are recorded and reproduced by the digital data.

Digital data is recorded and reproduced along the recording track formed on the optical disk medium and for recording and reproducing units, sectors are set in such a manner to divide the one-round recording track as shown in the track format of FIG. 1. Each sector consists of address ID (ADRS) set at the head which shows the pre-formatted sector address, audio data 0, audio data 1, and video data are managed on the disk medium with gaps in-between. The disk rotating speed is constant and the audio data and video data recording and reproducing timing is controlled with the address ID detection dining set as a standard. Every time the disk medium is exchanged, the disk center deviates by about scores of micrometers, and the timing of data deviates due to this center deviation. However, the above-mentioned gaps are provided with this deviation taken into account to prevent any trouble from occurring in recording and reproduction.

The video data part begins with a VFO (variable frequency oscillator), which is a fixed continuous pattern for synchronizing clock reproduction, and comprises an 8-byte-long pre-amble block which begins with SYNC (synchronization) BYTES, a continuation of a 94-byte-long block beginning from RESYNC (resynchronization) BYTES, and finally 4-byte-long post-amble block including RESYNC BYTES. The SYNC BYTES and RESYNC BYTES are used to achieve data synchronization when reproduced signals are decoded, and SYNC BYTES and RESYNC BYTES are designed to have the same pattern.

This format is a recording format of a ZCAV (zone-divided constant angular velocity) system with a storage capacity increased by dividing the recording tracks in a plurality of zones in accordance with the size of the disk radius and varying the number of blocks beginning from the above-mentioned RESYNC BYTES in accordance with the zone, and the number of blocks is varied from 106 to 200 in accordance with the disk radius position of the track.

Now, the roles of the digital data encoding apparatus are to encode the data into a data stream formatted as shown in FIG. 1, and, then, to insert SYNC BYTES or RESYNC BYTES. The roles of the digital data decoding apparatus are to detect SYNC BYTES or RESYNC BYTES from the data detected from the reproduced signals, and based on the detection results, to decode the data while achieving proper bit synchronization of the decoder and to obtain the original recorded data.

A (1, 7) code is used for encoding. Table 2 shows the conversion table of the (1, 7) code. In Table 2, a 3-bit code is signed for 2-bit data before encoding, and as an exception, a 6-bit code is assigned to the 4-bit data list in the table. As a result, for any size of data list, in the encoded code list, a "1" is separated by a minimum of one "0" and a maximum of seven "0's." At the time of decoding, conversely, 2-bit or 4-bit data is assigned to 3-bit or 6-bit code, and therefore, it is necessary to achieve synchronization in units of 2-bit data to 3-bit code.

Figure 2:
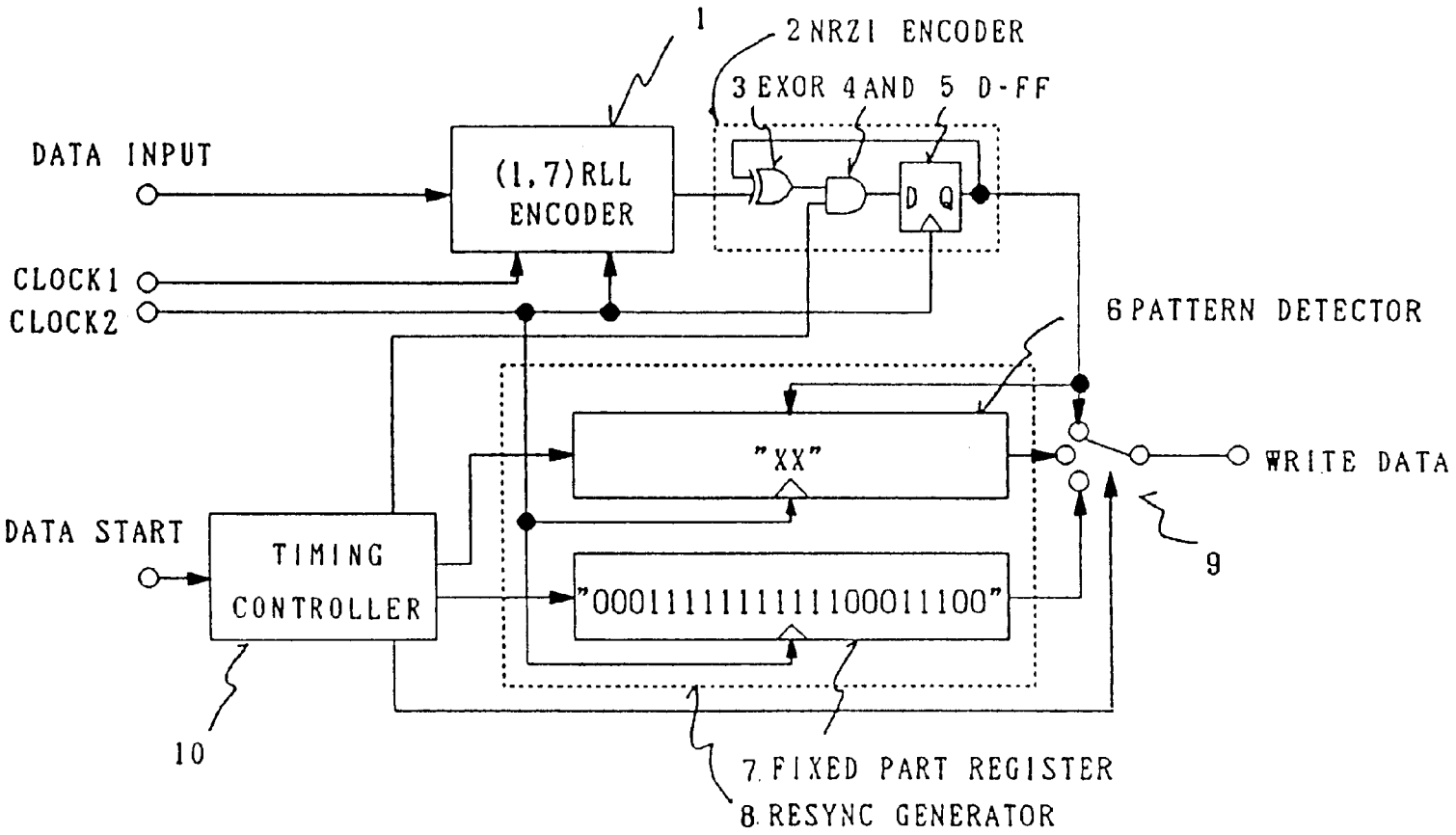
FIG. 2 is a block diagram illustrating a digital encoding apparatus in one embodiment of the present invention.
Figure 3:
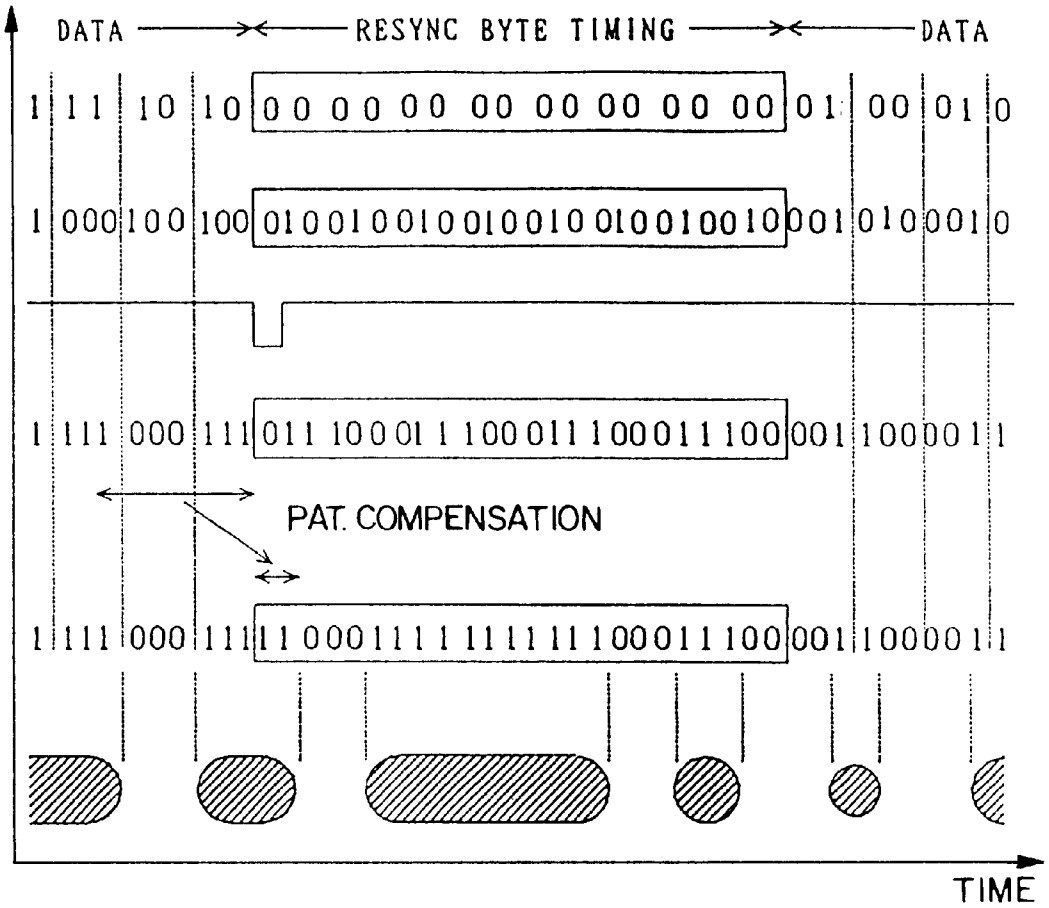
FIG. 3 is signal waveform illustrating the operation of FIG. 2.

FIG. 2 shows a configuration of a digital data encoding apparatus in one embodiment according to the present invention, while FIG. 3 illusion the signal waveform to describe the operation.

In FIG. 2, numeral 1 denotes the (1, 7) encoder, 2 the NRZI encoder, 3 an exclusive OR gate, 4 an AND gate, 5 D-type flip flop, 6 a pattern detector, 7 a fixed part register, 8 a RESYNC generator, 9 a switch, and 10 a timing controller. The RESYNC generator 8 and switch 9 compose a RESYNC adding means. Now referring to FIG. 2 and FIG. 3, operation of the digital data encoding apparatus configured as above is described.

In FIG. 1, the digital data are formatted as VFO-RESYNC BYTES, post-amble, etc. Are arranged, and added to the (1,7) RLL encoder L The (1, 7) RLL encoder 1 converts the data in accordance with the conversion table shown in Table 2 and outputs. For example, in the formated data corresponding to VFO, a value consisting of all continuous "0" is fixedly given, and as clear from Table 2, in the encoder output, a single "010" pattern continues. This single pattern is used for pull-in of PLL which carries out clock reproduction at the time of reproduction. The data corresponding to RESYNC BYTES is 2 bytes long and has 16 consecutive "0's" arranged in advance, and the RESYNC BYTES inserted after encoding are 24 bits.

Now, RESYNC BYTES comprise a bit compensation part (BCP) which is {Ca Ca 0 0 0} (Ca=0, 1), a RESYNC detection part (RDP) consisting of 11 consecutive "1" {1 1 1 1 1 1 1 1 1 1 1}, and a bit-synchronization part (BSP) of {0 0 0 1 1 1 0 0}, and is expressed as {Ca Ca 0 0 0 1 1 1 1 1 1 1 1 1 1 1 1 0 0 0 1 1 1 0 0} (1)

FIG. 3 (a) shows the data in the vicinity including this RESYNC BYTE, and the data (b) encoded by the (1, 7) RLL encoder 1 is further encoded with the NRZI encoder comprising the exclusive OR gate 3, AND gate 4, and D-type flip flop 5. In this event, adding the RESYNC positioning signal (c) given by the timing controller 10 to the AND gate 4 initializes the NRZI encoder 2 for every RESYNC BYTE position. This initialization causes the NRZI encoder 2 output to be (d) and the NRZI encoder 2 output at the position right after RESYNC BYTE is fixed to "0." In addition, the pattern detector 6 is controlled by the timing controller 10, monitors the patterns of NRZI encoder 2 output, and outputs No. 1 and No. 2 bits of the bit compensation part as {1 1} or {0 0} in accordance with the patterns right before the RESYNC BYTE. In the example of FIG. 3, {1 1} is outputted. The code patterns right before the RESYNC BYTE after NRZI encoding are classified as shown in Table 3 with an the combinations shown in Table 2 taken into account. Following this, the fixed part register 7 outputs {0 0 0 1 1 1 1 1 1 1 1 1 1 1 1 0 0 0 1 1 1 0 0}. In this event, the code data inserted as RESYNC BYTE is (1) and Ca=1.

{1 1 0 0 0 1 1 1 1 1 1 1 1 1 1 1 0 0 0 1 1 1 0 0}

The switch 9 insets the output of the RESYNC generator 8, which comprises the pattern detector 6 and fixed part register 7, to the NRZ1 encoder 2 by the RESYNC BYTE timing given by the timing controller 10. Consequently, the output of switch 9 becomes as shown with (e) and the recorded data are recorded and the recorded mark is formed as per (f).

With a series of operations as above, the recorded data becomes the (1, 7)-coded and NRZI-encoded code stream with RESYNC BYTES periodically inserted. The bit compensation part in RESYNC BYTES operates to enable the (1, 7) encoding rule to be smoothly connected to the RESYNC detection part in inserting RESYNC BYTES, and RESYNC BYTES are configured to enable the RESYNC detection part to have 11 consecutive "1's," and the bit synchronization part has an isolated {1 1 1} pattern separated by "0's".

In the above configuration and operation, the RESYNC detection part is designed to fixedly have 11 consecutive "1's" but if it is not fixed to "1" and may be a continuation of either "1's" or "0's," initialization of the NRZI encoder 2 is not needed and the circuit can be simplified. The RESYNC BYTE in this case is expressed as follows in which the RESYNC BYTE should be that before NRZI encoding is performed in the case of (1), and {Cb 0 Cc 0 0 0} (Cb, Cc=0, 1) is assigned to the bit compensation part, {1 0 0 0 0 0 0 0 0 0 0} to the RESYNC detection part and {1 0 0 1 0 0 1 0} to the bit synchronization part {Cb 0 Cc 0 0 0 1 0 0 0 0 0 0 0 0 0 0 1 0 0 1 0 0 1 0} (2).

This means that after this RESYNC BYTE is inserted into the (1, 7) encoded data, NMZI encoding is performed. That is, the pattern detection part monitors the data right before RESYNC BYTES of the data stream (1, 7) encoded as per (b) of FIG. 3 and outputs No. 1 to No. 3 bits among the bit compensation part {Cb 0 Ca 00} given by Table 4, while the fixed part register outputs the remaining 2 bits {0 0} of the bit compensation part, {1 0 0 0 0 0 0 0 0 0 0} of the RESYNC detection part, and {1 0 0 1 0 0 1 0} of the bit synchronization part.

After this RESYNC BYTE is inserted into a proper position by a switch, NRZI encoding takes place. Consequently, the RESYNC BYTE part has the following two cases in the RESYNC detection part: one in which "0" continues and the other in which "1" continues:

{X X 1 1 1 0 0 0 0 0 0 0 0 0 0 0 1 1 1 0 0 0 1 1} X=0, 1 or

{X X 0 0 0 1 1 1 1 1 1 1 1 1 1 1 0 0 0 1 1 1 0 0} X=0, 1

In addition, RESYNC BYTES of (1) and (2) are 2 bytes in data length before encoding but to achieve resynchronization, still shorter configuration is possible. For example, in the example of RESYNC BYTES of 1.5 bytes long which corresponds to (2), the bit compensation part is assigned to {Cb 0} (Cb=0, 1), RESYNC detection part to {1 0 0 0 0 0 0 0 0 0 0}, and bit synchronization part to {1 0 0 1 0}; then, it is possible to use RESYNC BYTES of

{0 1 0 0 0 0 0 0 0 0 0 0 1 0 0 1 0} (3)

Figure 4:
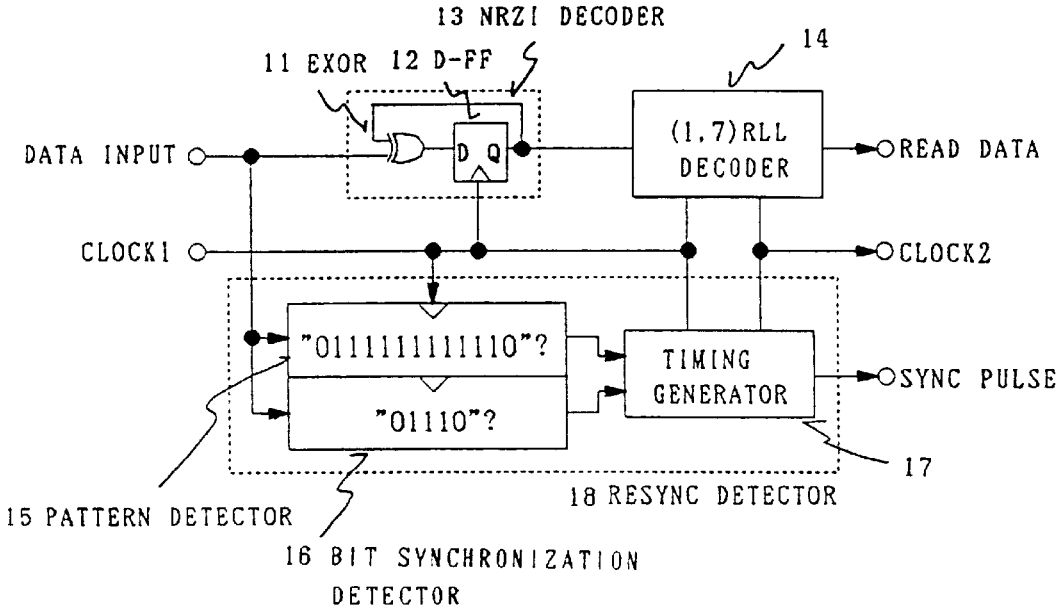
FIG. 4 is a block diagram illustrating the digital decoding apparatus in one embodiment of the present invention.
Figure 5:
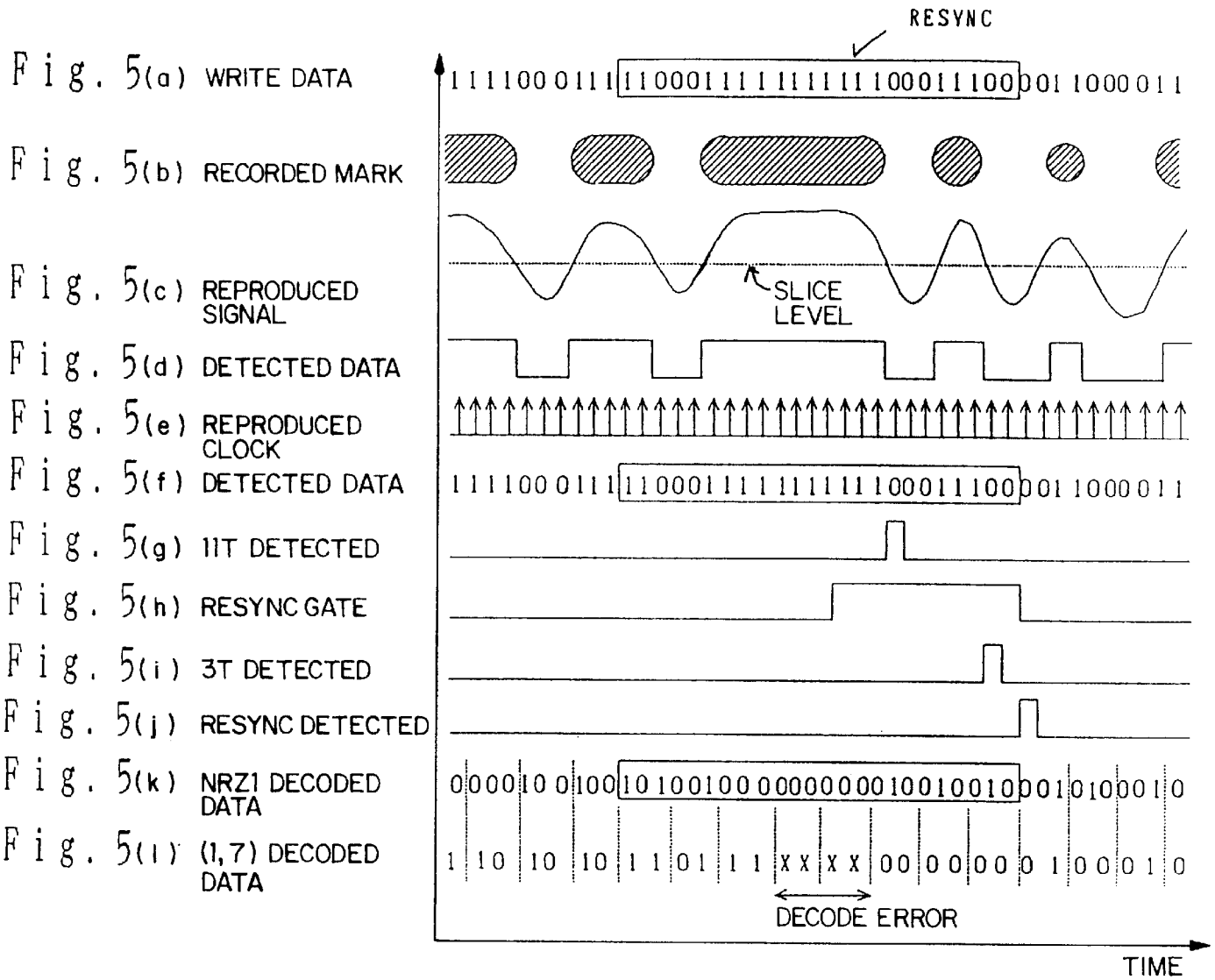
FIG. 5 is signal waveform illustrating the operation of FIG. 4.
Figure 6:
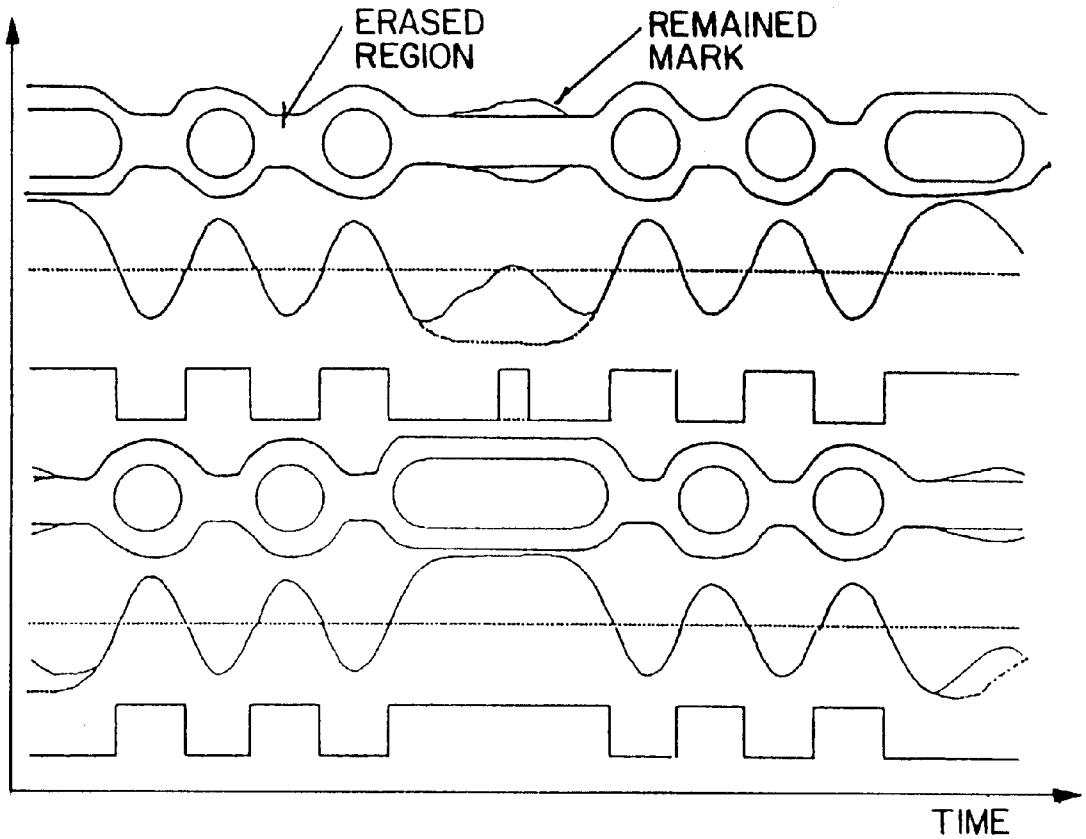
FIG. 6 is signal waveform illustrating the operation of FIG. 2.

FIG. 4 is an embodiment of the digital data decoding apparatus according, to the present invention, which corresponds to the digital data encoding apparatus of FIG. 2. FIG. 5 shows the waveform to describe the operation. In FIG. 4, numeral 11 is an exclusive OR gate, 12 a D-type flip flop, 13 a NRZI decoder, 14 a (1, 7) decoder, 15 a pattern detector, 16 a bit synchronization detector, 17 a timing generator, and 18 a RESYNC detector comprising 15, 16 and 17.

The reproduced signal obtained by reproducing the recorded mark (b) formed by recording the recorded data shown in FIG. 5 (a) is the signal as shown in (c), in which the recorded data is low-pass-filtered. This reduced signal is data-detected and the recorded code stream is obtained. In data detection, first of all, a suitable slice level is provided for the reproduced signal and is made into the binary-coded signal by a comparator as shown in (d). From this binary-coded signal, the reproduced clock signal CLOCK1 of (e), the clock component is reproduced by the phase locked loop, and based on this reproduced clock signal, the recorded code data is detected as shown in (f).

The obtained signal (f) is inputted into FIG. 4. The pattern detector 15 detects the generation of the RESYNC detection part as shown in (g). In this detection, because in the code stream outside the RESYNC BYTES, a maximum 8 "1's" are allowed continue based on the (1, 7) conversion rule, it is assumed that there would be no mis-detection of the RESYNC detection part. The bit synchronization detector 16 detects "0 1 1 1 0" and outputs as shown in (i). The timing generator 17 uses outputs of the pattern detector 15 and bit synchronization detector 16 as its inputs, and outputs RESYNC detection signal (j) as well as signal CLOCK2 corresponding to the clock of decoded data, which is (1,7) encoded, when the RESYNC detection part of RESYNC BYTES and then the bit synchronization part can be detected while the RESYNC gate signal of FIG. 5 (h) is enabled, and in addition, from the RESYNC BYTE cycle defined by the recording format, the timing generator 17 generates the above-mentioned RESYNC gate signal. The NRZI decoder 13 NRZI-decodes the input code stream and outputs as shown in (k). The (1, 7) decoder 14 decodes the data in accordance with the inverse conversion rule shown in Table 2 from the decoded clock CLOCK2 in good bit synchronization outputted by the timing generator 17 and outputs as shown in (1). At this point, in (1, 7) decoding, because the RESYNC detector is the data which does not satisfy the conversion rule, it always generates an error resulting in demodulation failure at the portion corresponding to RESYNC BYTES, but because of the characteristics of the conversion rule shown in Table 2 this error does not propagate beyond RESYNC BYTES and the RESYNC detector recovers normal decoding condition.

In the manner as described above, RESYNC BYTES are detected and correct decoding takes place.

In a series of operations as above, the mark formed as the RESYNC detector is comparatively longer than that of other data portions, and the peak shift, etc. generated by recording and reproduction is likely to increase. For this reason, the RESYNC detector tends to arrange by mistake 10 or 12 consecutive "1's." Considering such cases, it is allowed to assign all of 10, 11, and 12 consecutive "1's" in the code stream to the RESYNC detector as a detection standard of the pattern detector 15. The 10, 11, and 12 are examples of the k+2 to k+4. On the otherhand, in the (1, 7) encoded data portion outside the RESYNC BYTES, the number of continuing "1's" is a maximum of 8, and even when this becomes nine consecutive "1's" by mistake due to the peak shift, this is not mistakenly taken as the RESYNC detector.

More generally, for the modulation expressed by the (d, k) conversion rule, the continuous length of "1's" at the RESYNC detector is assigned to k+3 and its detection standard is designated as k+2, k+3, or k+4. This same principle is applied to the case in which RESYNC BYTES of (2) are established to simplify the apparats, In addition as shown in FIG. 2, when the RESYNC detector is fixed to allow "1's" to continue, there are following advantages.

In the re-writable type optical disks, after erasing the data previously recorded, recording is carried out newly or recording is carried out simultaneously with erasing (direct overwrite) but there is a problem that the recording condition before overwriting remains unerased. In particular, in the phase change recording medium which records and reproduces information by the use of the change of reflectivity, the longer the space part; the more serious is the unerased problem, because the previously recorded mark remains unerased, which should have been erased during overwriting. In PPM recording, for example, as described in "Overwrite Characteristics in Phase Change Optical Disk" by Ishida et al. (Proc. of Int. Symp. on Optical Memory, 1989), the unerased area in the vicinity of the recorded mark is comparatively small and the problem of the unerased area is minor. However, in the PWM recording which utilizes all of the mark and space positional information, the problem of the unerased area is critical. It is known that this kind of unerased area problem is scarcely generated for the mark and significantly generated at the space portion only. In the above-mentioned RESYNC BYTE (2), if the RESYNC detector has consecutive "0's" the unerased area of the RESYNC detector as shown in FIG. 4 (a) causes a problem, producing the reproduced signal as shown in (b) at this portion. Consequently, in the binary-coded signal (c), RESYNC detection is disabled. However, when the RESYNC detector is fixed to "1" such as RESYNC BYTES (1), the effects of unerased mark area are small and even if the same level of the erased area exists, RESYNC detection is not disabled.

Figure 7:
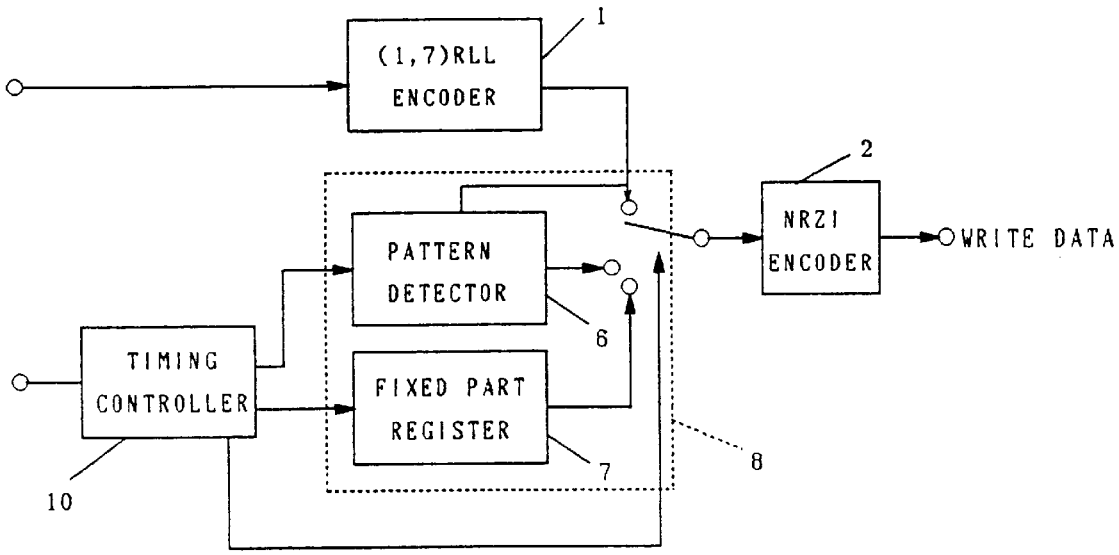
FIG. 7 is a block diagram illustrating the digital encoding apparatus in another embodiment of the present invention.

Meanwhile as shown in FIG. 7, the NRZI encoding operation can be executed after the RESYNC BITE adding operation.

As described above, the present invention contemplates to provide an excellent method and apparatus for digital data encoding/decoding which enables resynchronization without mistakenly detecting code data of other portions as RESYNC codes by arranging the RESYNC BYTES comprising a bit compensation part, RESYNC detection part, and a bit synchronization part in the code data after modulation, detecting the existence of RESYNC BYTES by detecting the RESYNC detection part, and further detecting the bit synchronization part to achieve bit resynchronization.

In particular, for the (1, 7) conversion rule of Table 2, the value of the digital data corresponding to the synchronization code can all be encoded to "0's" in advance and the code data corresponding to the bit synchronization part before they are replaced to RESYNC BYTES can be made identical to those after replacement, enabling the replacement by simple switching and providing features that the hardware can be simplified. In addition, decoding of the code data part following the RESYNC BYTES can be continuously carried out without any hindrance, enabling the easy initialization of the decoder by detection of the bit synchronization part A bit compensation part is provided before the RESYNC detection part, thereby achieving smooth connection between the code data and RESYNC BYTES, and the clock of the phase locked loop is reproduced without any trouble. In addition, by limiting the RESYNC detection part to the mark, misdetection of RESYNC BYTES by the unerased area can be reduced.

In addition, in the present invention, by taking a sufficiently long RESYNC detection part, the correlationship between the data part and RESYNC BYTES is made smaller, and RESYNC BYTE detection free from misdetection is achieved. If this feature is utilized, even in the CLV (constant linear velocity) system, a format adopted to compact disks, etc., it is apparent that the problem that the deviation of linear velocity of the recording track becomes greater than a specified level can be solved and satisfactory RESYNC detection is readily available.

TABLE 1

| DATA | CODE |
|---|---|
| 10 | 0100 |
| 010 | 100100 |
| 0010 | 00100100 |
| 11 | 1000 |
| 011 | 001000 |
| 0011 | 00001000 |
| 000 | 000100 |

TABLE 2

| DATA | CODE |
|---|---|
| 11 | 101 |
| 10 | 100 |
| 01 | 001 |
| 00 | 010 |
| 1111 | 101000 |
| 1110 | 100000 |
| 0111 | 001000 |
| 0110 | 010000 |

TABLE 3

| right before code | bit compensation part | Ca | substituted code array | | | |
|---|---|---|---|---|---|---|
| ← A → | | | ← A → | BCP ↔ | RDP ↔ | BSP ↔ |
| XXXXX0 1 | 11000 | 0 | XXXXX0 1 | 11000 | 11111111111 | 00011100 |
| XXXXX1 0 | 00000 | 0 | XXXXX1 0 | 00000 | 11111111111 | 00011100 |
| XXXX0 1 1 | 11000 | 1 | XXXX0 1 1 | 11000 | 11111111111 | 00011100 |
| XXXX1 0 0 | 00000 | 1 | XXXX1 0 0 | 00000 | 11111111111 | 00011100 |
| XXX0 1 1 1 | 11000 | 1 | XXX0 1 1 1 | 11000 | 11111111111 | 00011100 |
| XXX1 0 0 0 | 11000 | 1 | XXX1 0 0 0 | 11000 | 11111111111 | 00011100 |
| XX0 1 1 1 1 | 00000 | 0 | XX0 1 1 1 1 | 00000 | 11111111111 | 00011100 |
| XX1 0 0 0 0 | 11000 | 0 | XX1 0 0 0 0 | 11000 | 11111111111 | 00011100 |
| X0 1 1 1 1 1 | 00000 | 1 | X0 1 1 1 1 1 | 00000 | 11111111111 | 00011100 |
| X1 0 0 0 0 0 | 11000 | 1 | X1 0 0 0 0 0 | 11000 | 11111111111 | 00011100 |
| 0 1 1 1 1 1 1 | 00000 | 1 | 0 1 1 1 1 1 1 | 00000 | 11111111111 | 00011100 |
| 1 0 0 0 0 0 0 | 11000 | 1 | 1 0 0 0 0 0 0 | 11000 | 11111111111 | 00011100 |

TABLE 4

| right before code | bit compensation part | Aa | Ab | substituted code array | | | |
|---|---|---|---|---|---|---|---|
| ← A → | | | | ← A → | BCP ← → | RDP ← → | BSP ← → |
| XXXXX0 1 | 00100 | 0 | 1 | XXXXX0 1 | 00100 | 10000000000 | 10010010 |
| XXXX0 1 0 | 00100 | 0 | 1 | XXXX0 1 0 | 00100 | 10000000000 | 10010010 |
| XXX0 1 0 0 | 10000 | 1 | 0 | XXX0 1 0 0 | 10000 | 10000000000 | 10010010 |
| XX0 1 0 0 0 | 10000 | 1 | 0 | XX0 1 0 0 0 | 10000 | 10000000000 | 10010010 |
| X0 1 0 0 0 0 | 10000 | 1 | 0 | X0 1 0 0 0 0 | 10000 | 10000000000 | 10010010 |
| 0 1 0 0 0 0 0 | 10000 | 1 | 0 | 0 1 0 0 0 0 0 | 10000 | 10000000000 | 10010010 |

What is claimed is:

[1. An optical disk having a recording surface including first regions that represent first data and second regions that represent second data;

the first regions and the second regions together representing digital data carried by said disk and RESYNC BYTES present at a certain interval between groups of digital data on said disk;

the first regions and the second regions each having areas that represent the digital data as digital data that is encoded to satisfy a (d,k) conversion rule wherein d is a minimum number of first data and k is a maximum number of first data that separate a datum of the second data, and that represent the RESYNC BYES as bytes that each include a RESYNC detection part that violates the (dk) conversion rule, and a bit synchronization part that satisfies the (d,k) conversion rule.]

[2. An optical disk as claimed in claim 1, wherein the first regions include pits in the recording surface and the second regions do not include pits in the recording surface.]

[3. An optical disk as claimed in claim 2, wherein one of the first data and the second data is a logical "0" and the other of the first data and the second data is a logical "1" ;

wherein the representing areas of the first regions and the second regions further represent the RESYNC BYTES as BYTES that each include a bit compensation part located at a head position in the RESYNC BYTE, wherein the RESYNC detection part has a number N, of "0's" which separate "1's" that is N>k, and wherein the bit synchronization part consists of at least a minimum of one "0" and a minimum of one "1".]

[4. An optical disk as claimed in claim 3, wherein a "1" is separated by k+3 "0s" in the RESYNC detection part.]

[5. An optical disk as claimed in claim 2, wherein the areas of the first regions and the second regions represent the (d, k) encoded digital data and the RESYNC BYTE also as an NRZI encoded data stream.]

*6. An optical disk for recording data, comprising:*

*a recording surface including first regions for representing digital data that satisfy a (d, k) conversion rule and second regions for representing RESYNC BYTE data including RESYNC BYTES, said second regions being periodically inserted in said first regions, wherein*

*each of said RESYNC BYTES includes a RESYNC detection part that violates said (d, k) conversion rule and a bit synchronization part that satisfies said (d, k) conversion rule,*

*said digital data and said RESYNC BYTE data being comprised of first type data and second type data, and*

*d and k of said (d, k) conversion rule respectively indicate a minimum number and a maximum number of said first type data between two data of said second type data.*

*7. An optical disk according to claim 6, wherein said RESYNC detection part corresponds to a mark portion on said recording surface.*

*8. An optical disk according to claim 6, wherein one of said first type data and said second type data is a logical "0" and the other of said first type data and said second type data is a logical "1".*

*9. A digital coding method for recording data on an optical disk, said method comprising the steps of:*

*modulating digital data encoded in accordance with a (d, k) conversion rule for providing modulated data; and*

*adding RESYNC BYTE data including RESYNC BYTES in said modulated data,*

*each of said RESYNC BYTES comprising a RESYNC detection part which violates said (d, k) conversion rule and a bit synchronization part which satisfies said (d, k) conversion rule,*

*said digital data and said RESYNC BYTE data being comprised of first type data and second type data, and*

*d and k of said (d, k) conversion rule respectively indicating a minimum number and a maximum number of said first type data between two data of said second type data.*

*10. A digital coding method according to claim 9, wherein one of said first type data and said second type data is a logical "0" and the other of said first type data and said second type data is a logical "1".*

*11. A digital coding method according to claim 9, further comprising the step of encoding said modulated data and said RESYNC BYTE data according to an NRZI rule.*

* * * * *

UNITED STATES PATENT AND TRADEMARK OFFICE

CERTIFICATE OF CORRECTION

PATENT NO. : RE 37,801 E
DATED : July 23, 2002
INVENTOR(S) : Toshiyuki Shimada et al.

It is certified that error appears in the above-identified patent and that said Letters Patent is hereby corrected as shown below:

Column 1,
Line 8, insert:
-- [*] Notice: More than one reissue application has been filed for the reissue of patent 5,623,477. The reissue application are: application number 09/295,376 (the present application) and 10/137,488; 10/138,737 and 10/138,738 which are divisional application of 09/295,376. --.

Signed and Sealed this

Twenty-fifth Day of October, 2005

JON W. DUDAS
*Director of the United States Patent and Trademark Office*